United States Patent
Kirchhof

(10) Patent No.: US 6,939,100 B2
(45) Date of Patent: Sep. 6, 2005

(54) METHOD AND APPARATUS FOR CONTROLLING STEAM TURBINE INLET FLOW TO LIMIT SHELL AND ROTOR THERMAL STRESS

(75) Inventor: Darrin Glen Kirchhof, Schenectady, NY (US)

(73) Assignee: General Electric Company, Schenectady, NY (US)

(*) Notice: Subject to any disclaimer, the term of this patent is extended or adjusted under 35 U.S.C. 154(b) by 148 days.

(21) Appl. No.: 10/685,530

(22) Filed: Oct. 16, 2003

(65) Prior Publication Data

US 2005/0085949 A1 Apr. 21, 2005

(51) Int. Cl.$^7$ .............................................. F01D 17/08
(52) U.S. Cl. ............................ 415/1; 415/13; 415/17; 415/47
(58) Field of Search ................................ 415/1, 13, 17, 415/36, 42, 47, 48; 73/861.42, 204.11; 702/45, 50, 47, 48, 49, 130, 132, 136

(56) References Cited

U.S. PATENT DOCUMENTS

| | | | |
|---|---|---|---|
| 4,303,369 A | * 12/1981 | Hisano et al. | ........... 415/1 |
| 4,309,873 A | 1/1982 | Koran et al. | |
| 4,320,625 A | 3/1982 | Westphal et al. | |
| 4,668,161 A | 5/1987 | Miller et al. | |
| 5,498,131 A | 3/1996 | Minto | |
| 6,250,877 B1 | 6/2001 | Westphal et al. | |

* cited by examiner

Primary Examiner—Christopher Verdier
(74) Attorney, Agent, or Firm—Nixon & Vanderhye P.C.

(57) ABSTRACT

In a method of controlling steam flow through a steam turbine having a turbine rotor, a maximum heat transfer rate is determined based on thermal stress calculations in the turbine rotor. A maximum steam flow rate can be calculated based on the maximum heat transfer rate. An actual steam flow rate through the steam turbine is determined, and a turbine inlet valve is controlled based on a difference between the actual steam flow rate and the maximum steam flow rate. In this manner, steam flow can be controlled to the steam turbine in such a way as to limit thermal stress to an acceptable level while minimizing start times and maximizing operability.

17 Claims, 2 Drawing Sheets

METHOD AND APPARATUS FOR CONTROLLING STEAM TURBINE INLET FLOW TO LIMIT SHELL AND ROTOR THERMAL STRESS

BACKGROUND OF THE INVENTION

The present invention relates to steam turbine control and performance and, more particularly, to a control algorithm and system effecting loading and unloading of steam turbines while maintaining life cycle stress within limits by the use of controlled heating of the turbine shell and rotor.

Power generation steam turbines have large diameter rotors and thick shells. The rotors experience stress as the result of centrifugal loading and thermal expansion during loading and unloading cycles. During each start/stop cycle, the rotor and shell accumulate low cycle fatigue. When the low cycle fatigue accumulated exceeds the material limits, there exists a probability of crack formation, and the equipment must be replaced. The level of low cycle fatigue damage accumulated during each start cycle is a function of the peak stress experience for that start cycle. The turbine inlet steam temperature and flow determine the rate of metal temperature change and thus thermal stress in the shell and rotor.

The current method to control thermal stress in steam turbines involves estimating rotor stress as a function of a temperature measurement, typically shell metal near the turbine inlet. As the stress estimate approaches the low cycle fatigue limit, the opening rate of the steam turbine inlet valve is reduced. The disadvantage to this approach is that peak stress occurs ten to fifteen minutes after thermal transients. Because the time delay is so long, in order to prevent high stress cycles, very low steam flow rates are required. This limits the operability of the turbine and extends startup time.

It would thus be desirable to effect control of steam flow to the steam turbine in such a way as to limit thermal stress to an acceptable level while minimizing start times and maximizing operability.

BRIEF DESCRIPTION OF THE INVENTION

In an exemplary embodiment of the invention, a method of controlling steam flow through a steam turbine having a turbine rotor includes the steps of (a) determining a maximum heat transfer rate based on thermal stress calculations in the turbine rotor; (b) calculating a maximum steam flow rate based on the maximum heat transfer rate; (c) determining an actual steam flow rate through the steam turbine; and (d) controlling a turbine inlet valve based on a difference between the actual steam flow rate and the maximum steam flow rate.

In another exemplary embodiment of the invention, a method of operating a steam turbine having a turbine rotor includes the steps of (a) calculating a maximum steam flow rate based on parameters relating to thermal stresses in the turbine rotor; (b) determining an actual steam flow rate through the steam turbine; and (c) controlling a turbine inlet valve based on a difference between the actual steam flow rate and the maximum steam flow rate.

In still another exemplary embodiment of the invention, a control system for controlling steam flow through a steam turbine having a turbine rotor includes first and second temperature measuring devices that measure inlet steam temperature and rotor surface temperature as approximated by shell inner surface temperature. First and second pressure measuring devices measure inlet steam pressure and exit steam pressure. A controller communicates with the first and second temperature measuring devices and the first and second pressure measuring devices and determines a maximum heat transfer rate according to a rotor surface stress and a rotor bore stress determined based on (1) a difference between rotor surface temperature and rotor bore temperature and (2) average rotor temperature thermal stress calculations in the turbine rotor. The controller (i) calculates a maximum steam flow rate based on the maximum heat transfer rate, (ii) determines an actual steam flow rate through the steam turbine based on inlet steam pressure, inlet steam temperature and exit steam pressure, and (iii) controls a turbine inlet valve based on a difference between the actual steam flow rate and the maximum steam flow rate.

DETAILED DESCRIPTION OF THE INVENTION

Thermal power plants such as steam turbines have boilers that burn fuel to make heat. In a power plant, heat energy is conducted into metal pipes, heating water in the pipes until it boils into steam. The steam is fed under high pressure to the turbine. The turbine has a plurality blades or buckets that are turned at an angle. When the steam hits the buckets, they spin a turbine shaft, which is attached to the bottom of the buckets. As the turbine shaft spins, a generator converts the mechanical spinning energy into electricity.

The generator has a magnet inside a stationary ring wrapped with a wire or coil. As the magnet inside the generator turns, an electric current is produced in the wire, thus converting mechanical energy into electrical energy.

Heat transfer in a steam turbine is controlled by adjusting steam flow to the turbine by modulation of the steam turbine inlet control valves. As will be described in more detail below, steam flow rate may be determined based on inlet steam temperature and shell metal temperature that results in a suitable heat transfer rate that limits the thermal stress in the steam turbine shell and rotor. Turbine inlet steam pressure, inlet steam temperature and turbine exit pressure are used to calculate steam turbine flow rate, which may be used as the measured feedback of a control loop.

Figure 1:
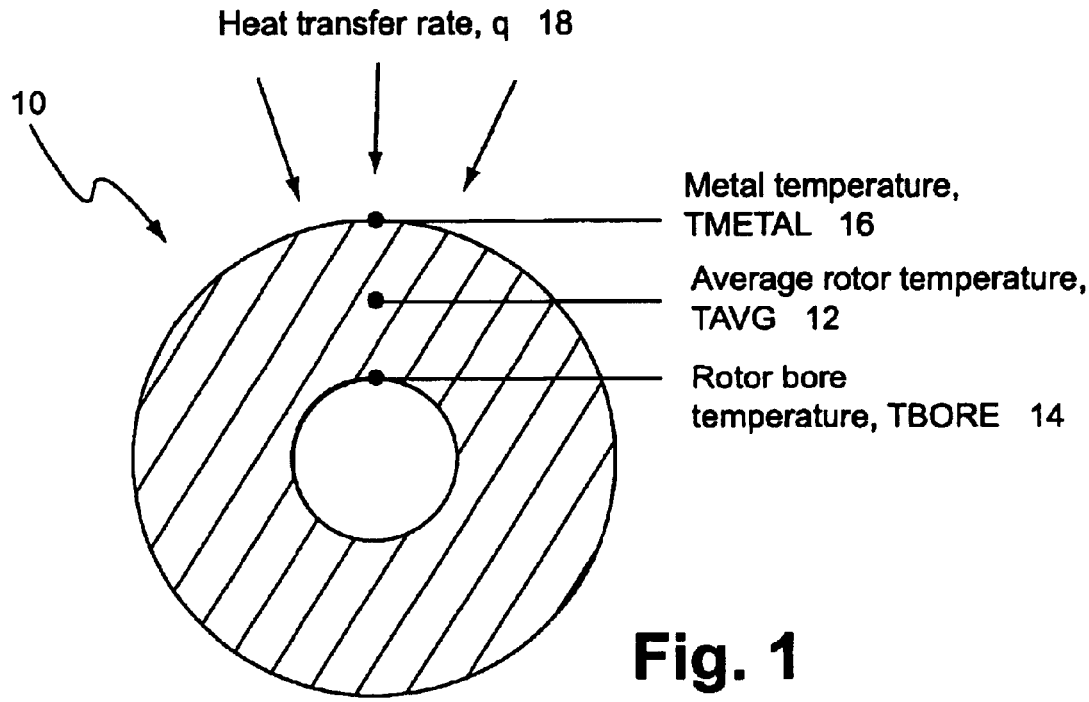
FIG. 1 is a schematic cross section of a turbine rotor.

A loading rate of a steam turbine is limited by the maximum allowable stress caused by temperature gradients within the rotor. FIG. 1 is a schematic exemplary illustration of a rotor cross section 10. The thermal bore stress is given by $$\sigma_B = \frac{E\alpha}{1-\nu}(T_{avg} - T_{bore})$$

where E is the modulus of elasticity, $\alpha$ is the coefficient of thermal expansion and $\nu$ is the Poisson's ratio. $T_{AVG}$ 12 is the rotor average metal temperature, and $T_{BORE}$ 14 is the rotor bore metal temperature. The coefficient of thermal expansion is material dependent and a function of the rotor average temperature 12. The modulus of elasticity is material dependent and a function of bore temperature 14.

$$E = EMOD0 - T_{BORE} \cdot EMOD1$$

$$\alpha = \alpha_0 + T_{AVG} \cdot \alpha_1$$

where EMOD0, EMOD1, $\alpha_0$ and $\alpha_1$ in the above equations are constants. The calculated bore thermal stress is divided by the allowable bore stress to yield the normalized bore stress in percent.

The surface strain is given by $$\epsilon = \alpha(T_{MTL} - T_{AVG})$$

where $\alpha$ is the thermal coefficient of expansion, and $T_{MTL}$ is the rotor shell temperature 16. $T_{MTL}$ is measured by a thermocouple installed at the inner surface of the steam turbine shell. It is not practical to directly measure the rotor surface or bore temperature. $T_{BORE}$ and $T_{AVG}$ are calculated/approximated using a thermal model of the rotor, where $T_{MTL}$ is the boundary condition.

Using Hooke's Law, the surface stress can be attained from $$\sigma_s = E\epsilon.$$

The surface stress is normalized with respect to the allowable surface stress. The allowable surface stress is dependent on the thermal stress concentration factor and is different for loading and unloading.

As the above equations demonstrate, both surface and bore stresses are proportional to the temperature difference between the surface involved ($T_{MTL}$ 16 or $T_{BORE}$ 14) and the average rotor temperature ($T_{AVG}$) 12.

Heat transfer for a cylinder is:

$$q_r = \frac{2\pi L k(T_{s,1} - T_{s,2})}{\ln(r_2/r_1)}$$

Since it is known that the thermal stress is proportional to the temperature difference within the rotor, and the temperature difference is proportional to the heat transfer rate q 18, thermal stresses can be controlled by controlling the heat transfer rate 18. A maximum heat transfer rate Qmax can be calculated, such that the temperature gradient results in acceptable surface and bore stress. The heat transfer rate is a function of temperature differential (Tstm–TMTL), and steam flow rate. Therefore, with reference to FIG. 3, maximum steam flow, Wmax, can be calculated based on maximum heat transfer rate, Qmax, steam temperature, Tstm, and steam turbine metal temperature, TMTL.

$$W_{max} = W_{1r} \times \left( \frac{Q_{max}}{\text{abs}(T_{stm} - T_{mtl}) \times k1} \right)^{k2}$$

where $W_{1r}$=Rated inlet flow (lbm/sec)
$Q_{max}$=Maximum heat transfer rate
$T_{stm}$=Inlet steam temperature (F)
$T_{MTL}$=shell temperature (F)
k1=tuning const.
K2=tuning const.

As the metal temperature approaches the steam temperature, the temperature differential ($T_{stm} - T_{MTL}$) decreases, allowing for a higher steam flow for a given $Q_{max}$.

Figure 2:
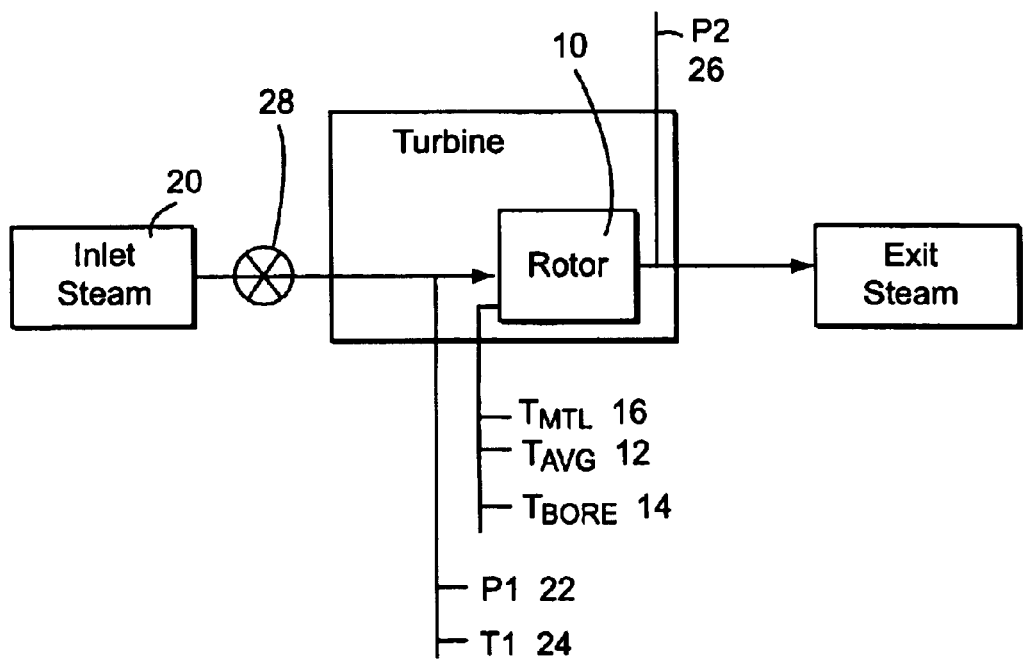
FIG. 2 is a schematic illustration of a turbine including various sensors.
Figure 3:
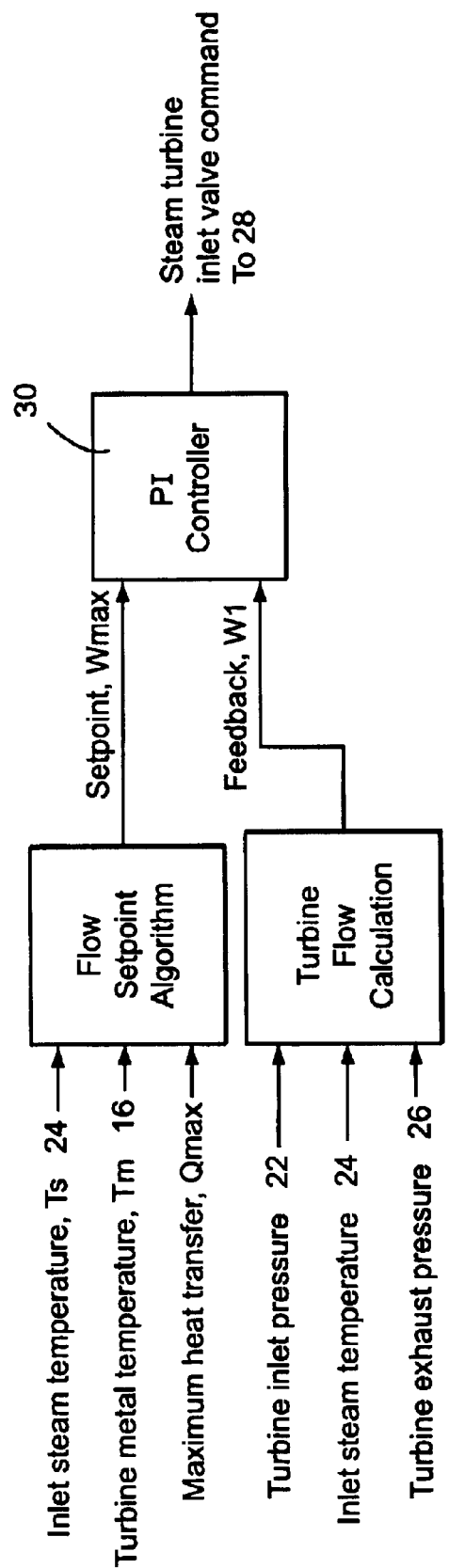
FIG. 3 is a schematic control diagram illustrating the control system and method.

For the control loop, with reference to FIGS. 2 and 3, steam flow 20 through the steam turbine can be calculated. The following equation is used to calculate the steam flow based on inlet steam pressure 22, P1, inlet steam temperature T1 24, and exit steam pressure P2 26.

$$W_1 = k\sqrt{\rho_1 P_1 (1 - X^2)}$$

with $$X = \frac{P_2}{P_1}$$

$$\rho_1 = f(P_1, T_1)$$

$$k = \frac{W_{1r}}{\sqrt{\rho_{1r} P_{1r}(1 - X_r^2)}}$$

$$X_r = \frac{P_{2r}}{P_{1r}}$$

$$\rho_{1r} = f(P_{1r}, T_{1r})$$

where $P_{1r}$ is rated inlet pressure (PSIA), $P_{2r}$ is rated outlet pressure (PSIA), $T_{1r}$ is rated inlet temperature (F) and $W_{1r}$ is rated inlet flow (lbm/sec). The rated steam conditions, $P_{1r}$, $P_{2r}$, $T_{1r}$, $W_{1r}$, occur at rated output for the particular turbine where the invention is applied. Typically, rated output is the normal full load output of the turbine. These steam conditions are determined during the design of the steam turbine by the steam turbine thermodynamic engineer. The rated steam conditions are used to calculate constants that can then be used to determine the steam turbine flow rate at operating points other than rated.

The steam flow, W1, is the feedback to a proportional plus integral controller 30 where the setpoint is maximum steam flow $W_{max}$ from above. The output of the controller commands a position of the steam turbine inlet control valve 28.

By controlling the steam turbine inlet control valve as a function of inlet steam temperature and shell metal temperature, the maximum amount of steam can be introduced to the turbine such that the heating rate does not cause thermal stress to exceed allowable levels. Also, factors other than stress, such as differential expansion or radial clearances may limit the loading rate of a steam turbine. In such a case, the control system and method can control the turbine heating rate, and thus limit differential expansion and control radial clearances.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of controlling steam flow through a steam turbine having a turbine rotor, the method comprising:
    (a) determining a maximum heat transfer rate based on thermal stress calculations in the turbine rotor;
    (b) calculating a maximum steam flow rate based on the maximum heat transfer rate;
    (c) determining an actual steam flow rate through the steam turbine; and
    (d) controlling a turbine inlet valve based on a difference between the actual steam flow rate and the maximum steam flow rate.

2. A method according to claim 1, wherein step (a) is practiced by determining a rotor surface stress and a rotor bore stress based on (1) a difference between rotor surface temperature and rotor bore temperature and (2) average rotor temperature.

3. A method according to claim 2, wherein step (b) is practiced by calculating the maximum steam flow rate ($W_{max}$) based on the maximum heat transfer rate ($Q_{max}$), steam temperature ($T_{stm}$) and turbine metal temperature ($T_{MTL}$).

4. A method according to claim 3, wherein step (b) is practiced by calculating the maximum steam flow rate ($W_{max}$) according to the following relation:

$$W_{max} = W_{1r} \times \left(\frac{Q_{max}}{abs(T_{stm} - T_{mtl}) \times k1}\right)^{k2}$$

where $W_{1r}$ is a rated inlet flow, and k1 and k2 are tuning constants.

5. A method according to claim 1, wherein step (b) is practiced by calculating the maximum steam flow rate ($W_{max}$) based on the maximum heat transfer rate ($Q_{max}$), steam temperature ($T_{stm}$) and turbine metal temperature ($T_{MTL}$).

6. A method according to claim 5, wherein step (b) is practiced by calculating the maximum steam flow rate ($W_{max}$) according to the following relation:

$$W_{max} = W_{1r} \times \left(\frac{Q_{max}}{abs(T_{stm} - T_{mtl}) \times k1}\right)^{k2}$$

where $W_{1r}$ is a rated inlet flow, and k1 and k2 are tuning constants.

7. A method according to claim 1, wherein step (c) is practiced by determining the actual steam flow rate through the steam turbine based on inlet steam pressure (P1), inlet steam temperature (T1), and exit steam pressure (P2).

8. A method according to claim 7, wherein step (c) is practiced by determining the actual steam flow rate through the steam turbine according to the following relations:

$$W_1 = k\sqrt{\rho_1 P_1(1-X^2)} \text{ with } X = \frac{P_2}{P_1}, \rho_1 = f(P_1, T_1),$$

$$k = \frac{W_{1r}}{\sqrt{\rho_{1r}P_{1r}(1-X_r^2)}}, X_r = \frac{P_{2r}}{P_{1r}} \text{ and } \rho_{1r} = f(P_{1r}, T_{1r}),$$

where $P_{1r}$ is rated inlet pressure, $P_{2r}$ is rated outlet pressure, $T_{1r}$ is rated inlet temperature, and $W_{1r}$ is rated inlet flow.

9. A method of operating a steam turbine having a turbine rotor, the method comprising:
(a) calculating a maximum steam flow rate based on parameters relating to thermal stresses in the turbine rotor;
(b) determining an actual steam flow rate through the steam turbine; and
(c) controlling a turbine inlet valve based on a difference between the actual steam flow rate and the maximum steam flow rate.

10. A method according to claim 9, wherein the parameters relating to thermal stresses in step (a) comprise a rotor surface stress and a rotor bore stress determined based on (1) a difference between rotor surface temperature and rotor bore temperature and (2) average rotor temperature.

11. A method according to claim 10, wherein step (a) is practiced by calculating the maximum steam flow rate ($W_{max}$) based on a maximum heat transfer rate ($Q_{max}$), steam temperature ($T_{stm}$) and turbine metal temperature ($T_{MTL}$).

12. A method according to claim 11, wherein step (a) is practiced by calculating the maximum steam flow rate ($W_{max}$) according to the following relation:

$$W_{max} = W_{1r} \times \left(\frac{Q_{max}}{abs(T_{stm} - T_{mtl}) \times k1}\right)^{k2}$$

where $W_{1r}$ is a rated inlet flow, and k1 and k2 are tuning constants.

13. A method according to claim 9, wherein step (a) is practiced by calculating the maximum steam flow rate ($W_{max}$) based on a maximum heat transfer rate ($Q_{max}$), steam temperature ($T_{stm}$) and turbine metal temperature ($T_{MTL}$).

14. A method according to claim 13, wherein step (a) is practiced by calculating the maximum steam flow rate ($W_{max}$) according to the following relation:

$$W_{max} = W_{1r} \times \left(\frac{Q_{max}}{abs(T_{stm} - T_{mtl}) \times k1}\right)^{k2}$$

where $W_{1r}$ is a rated inlet flow, and k1 and k2 are tuning constants.

15. A method according to claim 9, wherein step (b) is practiced by determining the actual steam flow rate through the steam turbine based on inlet steam pressure (P1), inlet steam temperature (T1), and exit steam pressure (P2).

16. A method according to claim 15, wherein step (b) is practiced by determining the actual steam flow rate through the steam turbine according to the following relations:

$$W_1 = k\sqrt{\rho_1 P_1(1-X^2)} \text{ with } X = \frac{P_2}{P_1}, \rho_1 = f(P_1, T_1),$$

$$k = \frac{W_{1r}}{\sqrt{\rho_{1r}P_{1r}(1-X_r^2)}}, X_r = \frac{P_{2r}}{P_{1r}} \text{ and } \rho_{1r} = f(P_{1r}, T_{1r}),$$

where $P_{1r}$ is rated inlet pressure, $P_{2r}$ is rated outlet pressure, $T_{1r}$ is rated inlet temperature, and $W_{1r}$ is rated inlet flow.

17. A control system for controlling steam flow through a steam turbine having a turbine rotor, the control system comprising:
a first temperature measuring device that measures inlet steam temperature;
a second temperature measuring device that measures a rotor surface temperature as approximated by shell inner surface temperature;
a first pressure measuring device that measures inlet steam pressure;
a second pressure measuring device that measures exit steam pressure; and
a controller communicating with said first and second temperature measuring devices and said first and second pressure measuring devices, the controller determining a maximum heat transfer rate according to a rotor surface stress and a rotor bore stress determined based on (1) a difference between rotor surface temperature and an approximated rotor bore temperature and (2) average rotor temperature thermal stress calculations in the turbine rotor,
wherein the controller calculates a maximum steam flow rate based on the maximum heat transfer rate, wherein the controller determines an actual steam flow rate through the steam turbine based on inlet steam pressure, inlet steam temperature and exit steam pressure, and wherein the controller controls a turbine inlet valve based on a difference between the actual steam flow rate and the maximum steam flow rate.

* * * * *